United States Patent [19]
Baek

[11] Patent Number: 5,777,697
[45] Date of Patent: Jul. 7, 1998

[54] LINEARITY COMPENSATION CIRCUIT FOR WIDE-SCREEN TELEVISION RECEIVER

[75] Inventor: Kwan Seung Baek, Kyungsangbuk-Do, Rep. of Korea

[73] Assignee: LG Electronics, Inc., Seoul, Rep. of Korea

[21] Appl. No.: 584,745

[22] Filed: Jan. 11, 1996

[30] Foreign Application Priority Data

Jan. 11, 1995 [KR] Rep. of Korea ............... 1995-00321U

[51] Int. Cl.[6] ................... H04N 3/32; H04N 3/37
[52] U.S. Cl. ............... 348/806; 348/556; 315/400; 315/370
[58] Field of Search ................ 348/806, 807, 348/704, 556, 445; 315/371, 370, 400, 408, 399; H01J 29/56; G09G 1/04; H04N 3/32, 3/37

[56] References Cited

U.S. PATENT DOCUMENTS

| 4,795,946 | 1/1989 | Nishiyama | 315/370 |
| 5,329,211 | 7/1994 | Sasaki et al. | 315/371 |
| 5,461,431 | 10/1995 | Takebuchi et al. | 348/806 |
| 5,473,224 | 12/1995 | Tsujihara et al. | 315/368.18 |
| 5,519,447 | 5/1996 | Shima et al. | 348/556 |

Primary Examiner—Glenton B. Burgess
Attorney, Agent, or Firm—Fish & Richardson P.C.

[57] ABSTRACT

A linearity compensation circuit for a wide-screen television receiver which can uniformly compensate for a picture linearity that may be distorted due to variation of deflection current when a display mode is changed from a 4×3 aspect ratio (AR) to 16×9 AR, and vice versa. The linearity compensation circuit includes a variable linearity compensation coil which is connected to a horizontal deflection coil, and a control section for varying the inductance value of the variable linearity compensation coil according to change of the 4×3 AR and 16×9 AR display modes so as to compensate for the linearity of the picture displayed on a display screen.

4 Claims, 6 Drawing Sheets

4:3 STANDARD SCREEN

FIG. 3B

16:9 WIDE SCREEN

LINEARITY COMPENSATION CIRCUIT FOR WIDE-SCREEN TELEVISION RECEIVER

BACKGROUND OF THE INVENTION

1. Field of the Invention

The present invention relates to a linearity compensation circuit for a wide-screen television receiver, and more particularly to a linearity compensation circuit for a wide-screen television receiver which can compensate for a picture linearity that may be distorted due to a variation of the deflection current when displaying a television picture having a 4×3 aspect ratio on a display screen having a 16×9 aspect ratio, and vice versa.

2. Description of the Related Art

A conventional wide-screen television receiver which has a display screen having a 16×9 aspect ratio (AR) generally displays 4×3 AR video signals as well as a 16×9 AR video signals. Thus, display modes are classified into a 4×3 standard mode and a 16×9 wide mode in which the picture is expanded by 33% in a horizontal direction. The horizontal deflection current is increased or decreased when the present display mode is converted to the other display mode.

Figure 1:
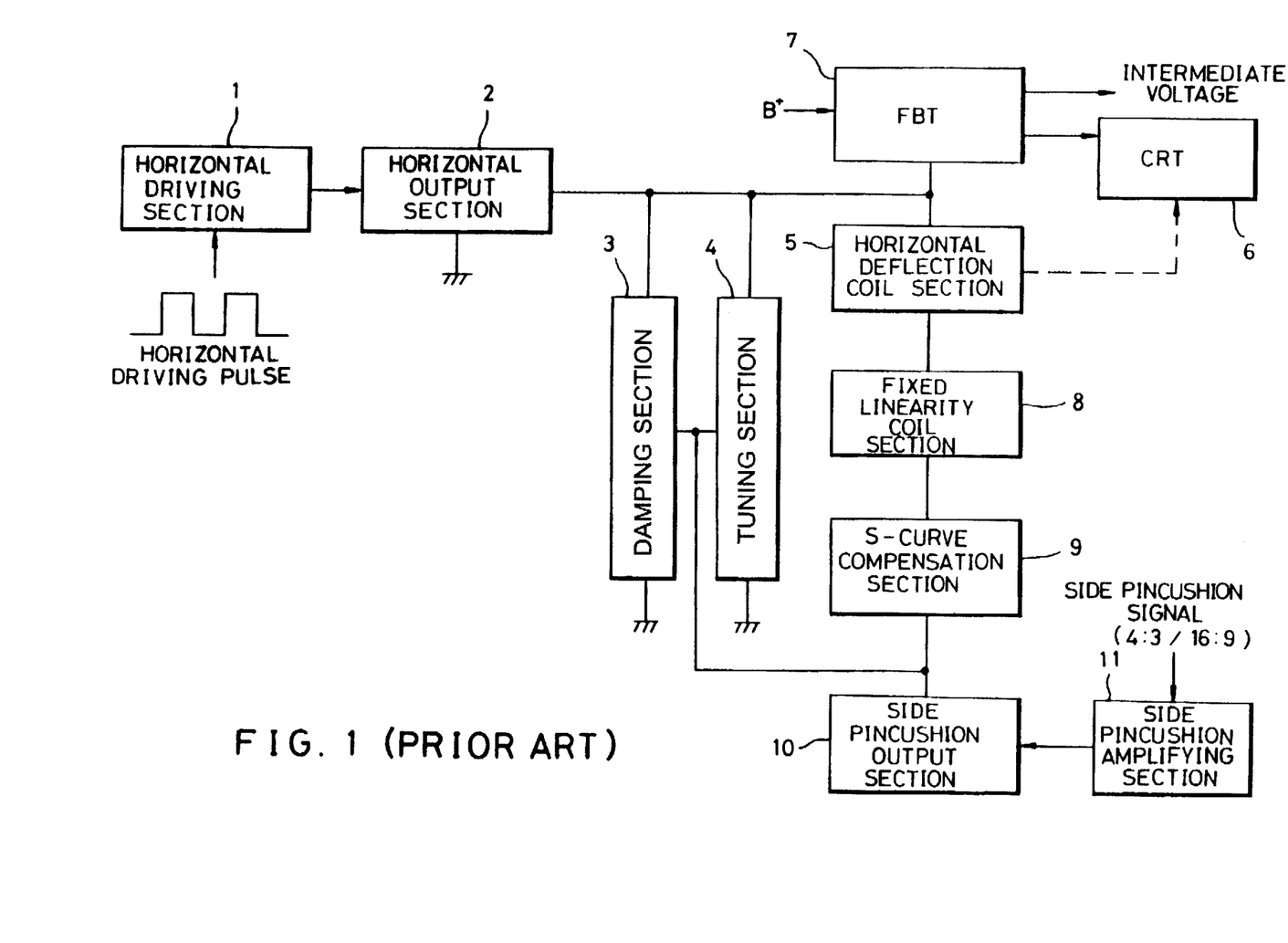
FIG. 1 is a block diagram of a conventional linearity compensation circuit for a wide-screen television receiver.
Figure 2:
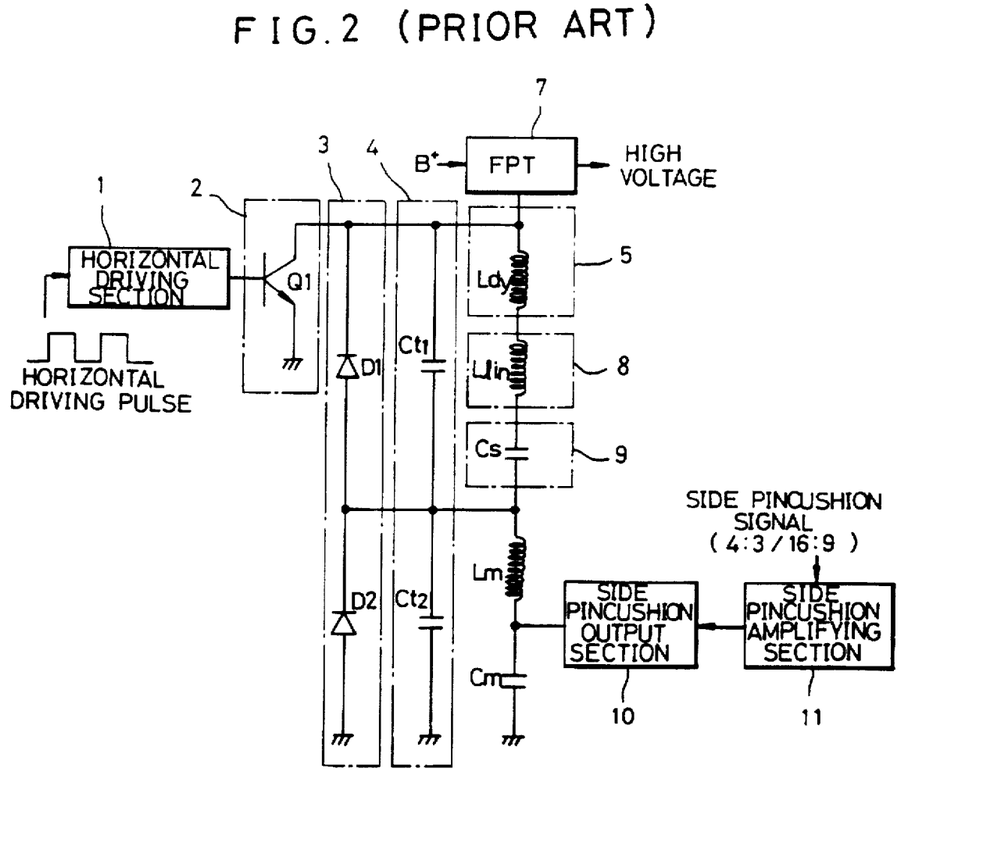
FIG. 2 is a schematic circuit diagram of the conventional linearity compensation circuit of FIG. 1.

FIG. 1 is a block diagram of a conventional linearity compensation circuit for a wide-screen television receiver, and FIG. 2 is a schematic circuit diagram of the circuit of FIG. 1.

Referring to FIGS. 1 and 2, the conventional linearity compensation circuit for a wide-screen television receiver is provided with a horizontal driving section 1, a horizontal output section 2 performing switching operation in accordance with the output of the horizontal driving section 1, a damping section 3 and a tuning section 4 for providing a horizontal deflection sawtooth current in accordance with the switching operation of the horizontal output section 2, and a horizontal deflection coil section 5 for deflecting electron beams on a cathode ray tube (CRT) 6 in accordance with the horizontal deflection sawtooth current flowing thereto from the damping section 3 and the tuning section 4.

The conventional linearity compensation circuit is also provided with a flyback transformer 7 for generating a high voltage, a fixed linearity coil section 8 for compensating for the linearity of the horizontal deflection coil section 5, an S-curve compensation section 9 for providing S-curve compensation current to the horizontal deflection coil section 5, a side pincushion amplifying section 11 for amplifying a side pincushion signal, and a side pincushion output section 10 for performing side pincushion compensation during the horizontal deflecting operation of the horizontal deflection coil section 5.

The horizontal output section 2 comprises a horizontal output transistor Q1, and the damping section 3 comprises damper diodes D1 and D2. The tuning section 4 comprises tuning capacitors Ct1 and Ct2, and the horizontal deflection coil section 5 comprises a horizontal deflection coil Ldy. The fixed linearity coil section 8 comprises a fixed linearity compensation coil Llin, and the side pincushion output section 10 comprises a side pincushion output coil Lm and capacitor Cm.

The operation of the conventional linearity compensation circuit for a wide-screen television receiver as constructed above will be described with reference to FIGS. 1 to 5.

When the horizontal driving pulse is supplied to the horizontal driving section 1, this section controls the on/off operation of the horizontal output transistor Q1 in the horizontal output section 2 in accordance with the horizontal driving pulse supplied thereto. As the transistor Q1 is turned on and off repeatedly, the damper diodes D1 and D2 in the damping section 3 perform a switching operation and the tuning capacitors Ct1 and Ct2 perform a resonance operation, resulting in the generation of the horizontal deflection sawtooth current. This sawtooth current is supplied to and flows through the horizontal deflection coil Ldy in the horizontal deflection coil section 5.

Specifically, in the first half of a horizontal scanning interval, the $B^+$ power supply voltage flows and is charged through a path consisting of the flyback transformer 7, horizontal deflection coil Ldy, linearity compensation coil Llin in the linearity coil section 8, compensation capacitor Cs in the S-curve compensation section 9, side pincushion coil Lm and capacitor Cm in order, causing the horizontal deflection sawtooth current to be supplied to the horizontal deflection coil Ldy. In the latter half of a horizontal scanning interval, the $B^+$ supply voltage charged in the S-curve compensation capacitor Cs is discharged and flows through another path consisting of the linearity compensation coil Llin, horizontal deflection coil Ldy, horizontal output transistor Q1, ground, side pincushion output capacitor Cm and coil Lm in order, causing the horizontal deflection sawtooth current to be supplied to the horizontal deflection coil Ldy. During the latter half of the horizontal scanning interval, the damper diodes D1 and D2 and the tuning capacitors Ct1 and Ct2 are maintained to be turned off.

Meanwhile, in the horizontal retrace period, the horizontal output transistor Q1 is turned off, and the reverse electromotive force developed in the horizontal deflection coil Ldy is supplied to the tuning capacitor Ct1, causing the horizontal deflection coil Ldy and the tuning capacitor Ct1 to resonate in parallel. At this time, a flyback pulse is generated on the contact point of the tuning capacitor Ct1 and the primary winding of the flyback transformer 7. At the same time, the reverse electromotive force developed in the side pincushion output coil Lm is supplied to the tuning capacitor Ct2, resulting in parallel resonance of the side pincushion output coil Lm and the tuning capacitor Ct2, and this causes a flyback pulse to be generated on the contact point of the tuning capacitor Ct2 and the side pincushion output coil Lm. The flyback pulses respectively generated by the tuning capacitors Ct1 and Ct2 are supplied to the flyback transformer 7, and thus a high voltage is developed in the secondary winding of the flyback transformer 7.

Thereafter, in the first half of the horizontal scanning interval, discharge operation from the tuning capacitor Ct1 to the horizontal deflection coil Ldy as well as that from the tuning capacitor Ct2 to the side pincushion output coil Lm is performed, causing reverse electromotive forces to be developed in the horizontal deflection coil Ldy and the side pincushion output coil Lm, respectively. If the reverse electromotive forces developed in the coils Ldy and Lm, respectively, are greater than the voltages discharged in the S-curve compensation capacitor Cs and the side pincushion output capacitor Cm, respectively, the damper diodes D1 and D2 are turned on, and accordingly, the horizontal deflection sawtooth current for the first half of the horizontal scanning interval is supplied to the horizontal deflection coil Ldy.

Meanwhile, the input side pincushion signal, which is a parabolic signal having vertical scanning intervals, is amplified in the amplifying section 11, and the amplified side pincushion signal is supplied to the side pincushion output capacitor Cm and coil Lm in the side pincushion output section 10, so that the side pincushion compensation is performed by modulating the horizontal deflection current with the vertical scanning intervals.

As the above-described compensation operation is performed, the DC voltage level of the side pincushion output capacitor Cm is varied in order to change the display mode of a 4×3 AR or 16×9 AR.

Specifically, if the DC bias level of the side pincushion output capacitor Cm is increased, the voltage level between both terminals of the S-curve compensation capacitor Cs is decreased, and thus the current flowing through the horizontal deflection coil Ldy is decreased, resulting in that the picture size to be displayed on the CRT 6 is also decreased (4×3 AR). On the other hand, if the DC bias level of the side pincushion output capacitor Cm is decreased, the voltage level between the both terminals of the S-curve compensation capacitor Cs is increased, and the current flowing through the horizontal deflection coil Ldy is increased, resulting in that the picture size is increased (16×9 AR).

However, the conventional linearity compensation circuit for a wide-screen television receiver has the drawback that the left and/or right linearity of the picture is distorted in both 4×3 standard mode and 16×9 wide mode due to the deviation of the inductance value of the linearity coil section, which corresponds to the variation of the horizontal deflection current, since the display mode conversion is achieved by varying the amount of the horizontal deflection current.

Figure 3A:
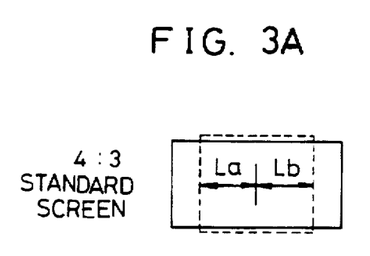
FIG. 3A is a view explaining display area of a 4×3 AR.
Figure 3B:
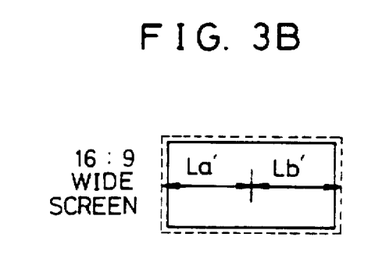
FIG. 3B is a view explaining display area of a 16×9 AR.

Specifically, the picture size of the 4×3 standard AR must satisfy the condition given by '$L_a=L_b$' as shown in FIG. 3A in order to prevent the distortion of the picture. In this condition, the equation "$(L_a+L_b) \times 1.33 = L_a' + L_b'$" is realized. However, if the amount of the horizontal deflection current is varied, the above described condition cannot be satisfied. The conventional linearity compensation circuit employs the fixed linearity compensation coil Llin having a fixed inductance value, and thus only the partial compensation for the picture distortion may be achieved.

Figure 4A:
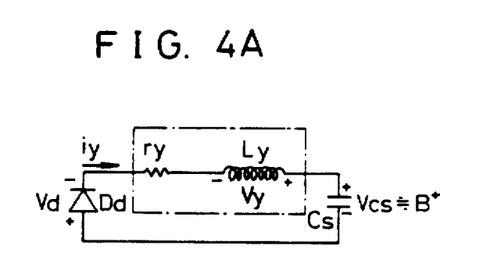
FIGS. 4A and 4B are diagrams of equivalent circuits of a horizontal output section in FIG. 2.
Figure 4B:
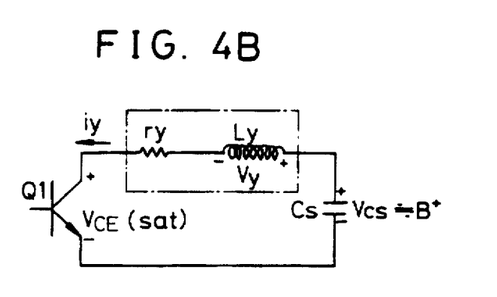

FIGS. 4A and 4B show the equivalent circuits of the horizontal output section in the first half and the latter half of the horizontal scanning interval, respectively, in case that the fixed linearity compensation coil Llin is employed. The compensation operation of the picture linearity by the conventional fixed linearity compensation coil Llin will be explained in detail with reference to FIGS. 4A and 4B.

As shown in FIGS. 4A and 4B, the horizontal deflection coil Ldy is expressed as its inductance value Ly and DC resistance value ry. Due to this DC resistance value ry, the right side of the displayed picture is somewhat compressed.

Specifically, in the first half of the horizontal scanning interval, the voltage Vy between both terminals of the horizontal deflection coil Ldy is given by '$V_y = B^+ + r_y I_y(pk) + V_d$' as shown in FIG. 4A, while in the latter half of the horizontal scanning interval, the voltage $V_y$ is given by '$V_y = B^+ + r_y I_y(pk) + V_{CE(sat)}$' as shown in FIG. 4B, where, $V_d$ represents the turned-on voltage of the diode Dd, and $V_{CE(sat)}$ represents the saturation voltage of the horizontal output transistor Q1.

According to the conventional linearity compensation circuit, the fixed linearity compensation coil Llin is connected to the horizontal deflection coil Ldy in series in order to compensate for the difference between the two voltage values as described above. The fixed linearity compensation coil Llin is saturated to act as an inductor having a very low inductance value during the horizontal deflection on the right portion of the display screen (i.e., in the first half of the horizontal scanning interval), while the inductance value of the fixed linearity compensation coil Llin is increased due to the reverse current flowing through the coil Llin during the horizontal deflection on the left portion of the display screen (i.e., in the latter half of the horizontal scanning interval), causing the horizontal deflection current to be reduced. Accordingly, the picture size to be displayed on the left side of the display screen is reduced, resulting in that the left and right portions of the displayed picture geometrically have the same length ($L_a = L_b$) to compensate for the linearity of the picture.

Figure 5:
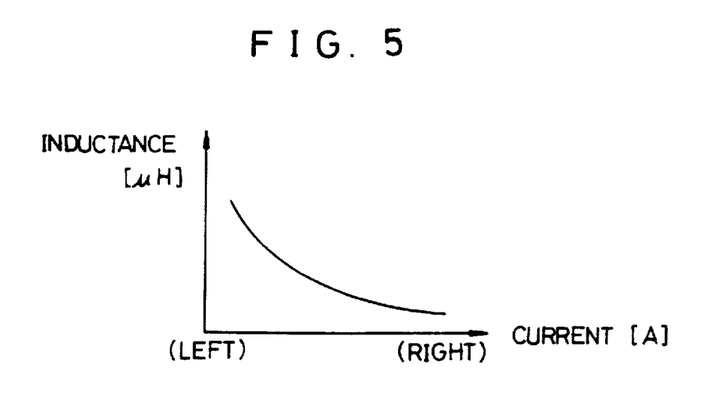
FIG. 5 is a graph explaining the characteristic of a fixed linearity compensation coil in FIG. 2.

The fixed linearity compensation coil Llin, however, has the fixed inductance value as shown in FIG. 5. If the linearity compensation is focused with respect to the 4×3 AR, the horizontal deflection current is increased in the 16×9 wide mode, and the right side of the displayed picture is distorted ($L_a' > L_b'$). On the contrary, if the linearity compensation is focused with respect to the 16×9 AR, the horizontal deflection current is decreased in the 4×3 standard mode, and the left side of the displayed picture is distorted ($L_a > L_b$).

In conclusion, according to the conventional linearity compensation circuit for a wide-screen television receiver, the linearity compensation can be achieved with respect to only either of the 4×3 AR and the 16×9 AR. Meanwhile, if the linearity compensation is focused with respect to the halfway value between the 4×3 AR and the 16×9 AR, each picture linearity in the 4×3 standard mode and the 16×9 wide mode will be somewhat degraded.

SUMMARY OF THE INVENTION

The present invention has been made to solve the problems involved in the prior art. It is an object of the present invention to provide a linearity compensation circuit for a wide-screen television receiver which can compensate for left and right linearity of a picture to be displayed on a display screen regardless of whether in 4×3 standard mode or 16×9 wide mode.

In order to achieve the above object, there is provided a linearity compensation circuit for a wide-screen television receiver which controls horizontal deflection current supplied to a horizontal deflection coil in accordance with a display mode of a 4×3 aspect ratio (AR) or a 16×9 AR, the linearity compensation circuit comprising:

variable linearity compensation coil means coupled to said horizontal deflection coil, an inductance value of said variable linearity compensation coil means being varied; and control means for controlling variation of said inductance value of said variable linearity compensation coil in accordance with change of said display mode of said 4×3 AR or said 16×9 AR so as to maintain a uniform linearity of a picture displayed on a display screen.

BRIEF DESCRIPTION OF THE DRAWINGS

The above object and other features of the present invention will become more apparent by describing the preferred embodiment thereof with reference to the accompanying drawings, in which.

DETAILED DESCRIPTION OF THE PREFERRED EMBODIMENT

Figure 6:
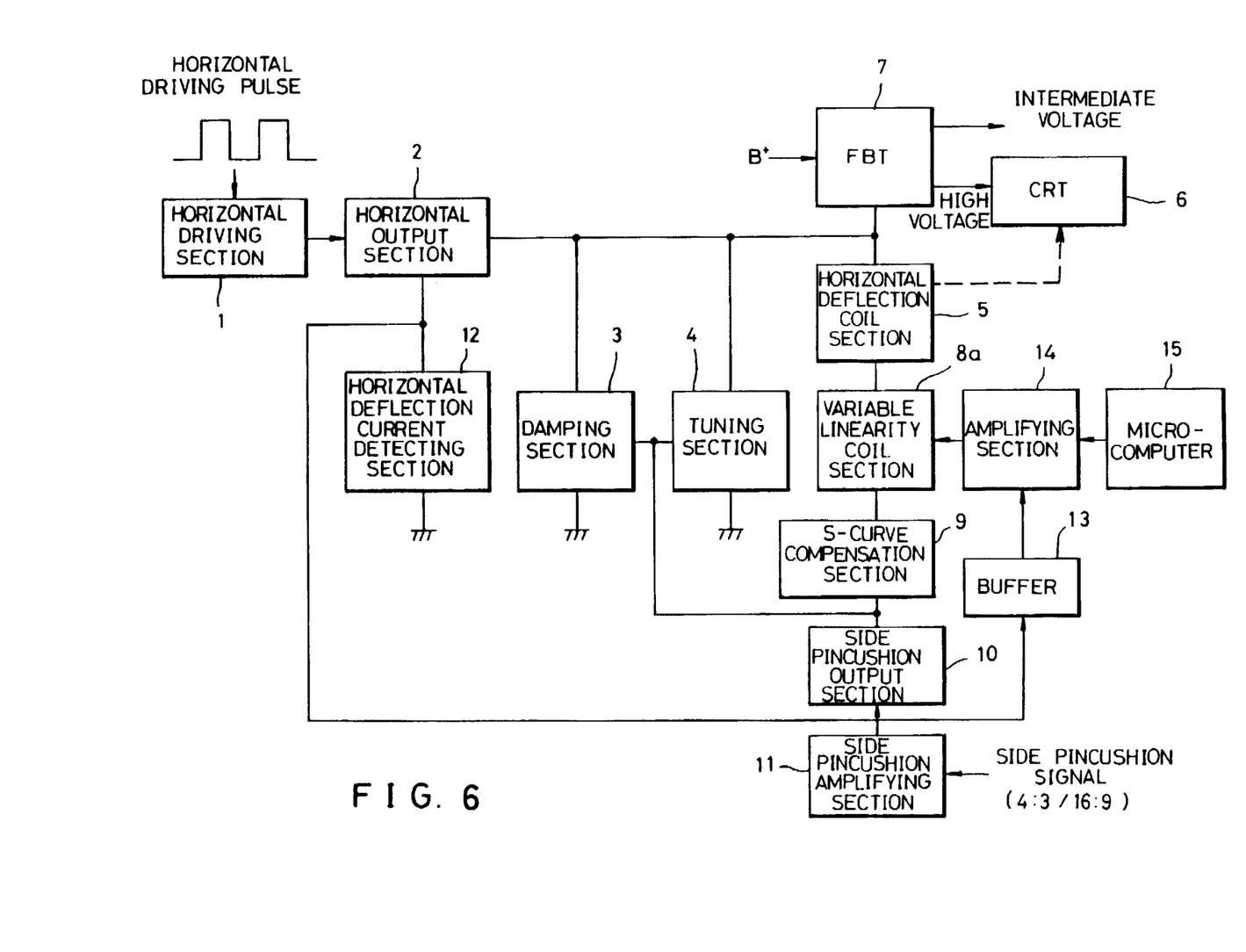
FIG. 6 is a block diagram of the linearity compensation circuit for a wide-screen television receiver according to the present invention.
Figure 7:
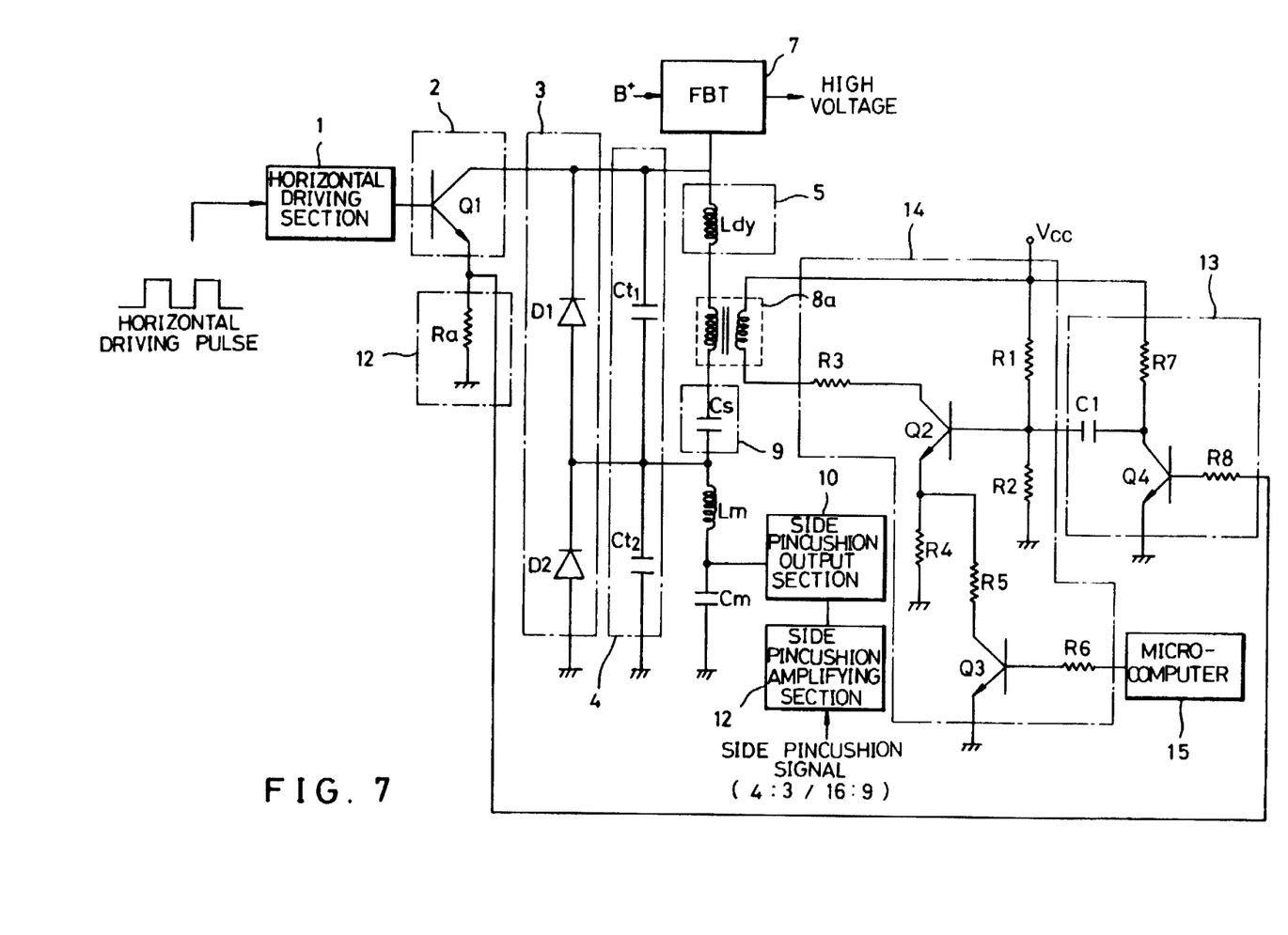
FIG. 7 is a schematic circuit diagram of the linearity compensation circuit according to the present invention.

FIGS. 6 and 7 show an embodiment of the linearity compensation circuit for a wide-screen television receiver according to the present invention.

Referring to FIGS. 6 and 7, the linearity compensation circuit according to the present invention is provided with a horizontal driving section 1, a horizontal output section 2 performing a switching operation in accordance with the output of the horizontal driving section 1, a damping section 3 and a tuning section 4 for providing a horizontal defection sawtooth current in accordance with the switching operation of the horizontal output section 2, a horizontal deflection coil section 5 for deflecting electron beams on a cathode ray tube (CRT) 6 in accordance with the horizontal deflection sawtooth current flowing thereto from the damping section 3 and the tuning section 4, and a flyback transformer 7 for generating a high voltage.

The linearity compensation circuit according to the present invention is also provided with a variable linearity coil section 8a, connected to the horizontal deflection coil section 5, the inductance value of the variable linearity coil section 8a is varied in accordance with change of a display mode of a 4×3 AR or a 16×9 AR, and variation of the horizontal deflection current, an S-curve compensation section 9 for providing S-curve compensation current to the horizontal deflection coil section 5, a side pincushion output section 10 for performing side pincushion compensation during the horizontal deflection operation of the horizontal deflection coil section 5, and a side pincushion amplifying section 11 for amplifying an input side pincushion signal and provident the amplified side pincushion signal to the side pincushion output section 10.

The linearity compensation circuit according to the present invention is also provided with a microcomputer 15 for providing a logic control signal in accordance with the display mode of a 4×3 AR or a 16×9 AR, a horizontal deflection current detecting section 12 for detecting the level of the horizontal deflection current from the horizontal output section 2, a buffer 13 for inverting the horizontal deflection current detected by the horizontal deflection current detecting section 12, and an amplifying section 14 for amplifying the inverted horizontal deflection current from the buffer 13 in accordance with the logic control signal of the microcomputer 15 and providing the amplified current to the variable linearity coil section 8a as an inductance control current.

Referring to FIG. 7, the horizontal output section 2 comprises a horizontal output transistor Q1, and the damping section 3 comprises damper diodes D1 and D2. The tuning section 4 comprises tuning capacitors Ct1 and Ct2, and the horizontal deflection coil section 5 comprises a horizontal deflection coil Ldy. The variable linearity coil section 8a comprises a variable inductance transformer in which the inductance value of its secondary winding is varied in accordance with a control current flowing through its primary winding. The side pincushion output section 10 comprises a side pincushion output coil Lm and capacitor Cm, and the horizontal deflection current detecting section 12 comprises a resistor Ra which detects an emitter current of the horizontal output transistor Q1.

The buffer 13 comprises a transistor Q4, bias resistors R7 and R8, and a coupling capacitor C1. The amplifying section 14 comprises a transistor Q3 which is turned on/off in accordance with the logic control signal from the microcomputer 15, a transistor Q2 and resistors R3 to R5 for supplying the control current to the primary winding of the variable inductance transformer 8a. The amplification factor of the amplifying section 14 is varied depending on the output level of the buffer 13 and the on/off state of the transistor Q3.

Figure 8:
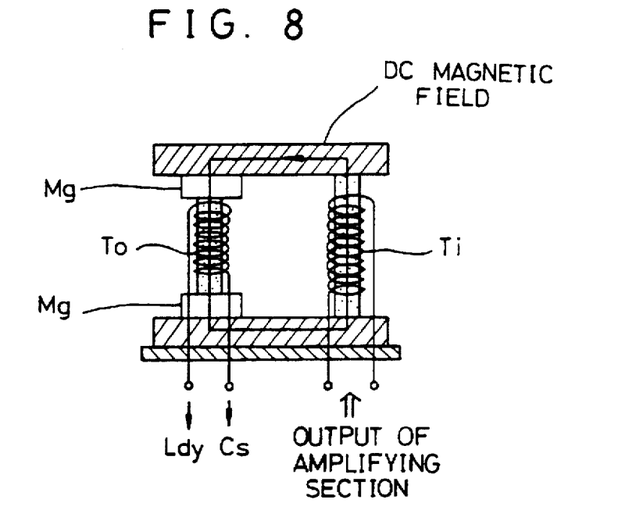
FIG. 8 is a view illustrating the shape of a variable linearity compensation coil employed in the circuit according to the present invention.
Figure 9:
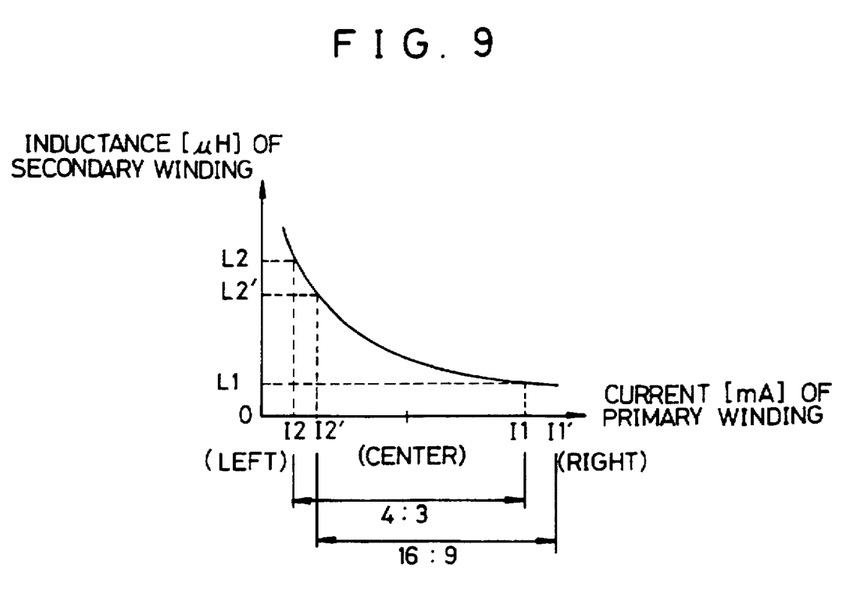
FIG. 9 is a graph explaining the characteristic of the variable linearity compensation coil employed in the circuit according to the present invention.

FIG. 8 show s the shape or construction of the variable inductance transformer 8a. Referring to FIG. 8, the variable inductance transformer 8a comprises a primary winding Ti and a secondary winding To combined with magnets Mg, which constitute a closed loop of a DC magnetic field. FIG. 9 is a graph showing the characteristic of the variable inductance transformer 8a. Referring to FIG. 9, the inductance value of the secondary winding To of the variable inductance transformer 8a is varied depending on the amount of the current flowing though the primary winding Ti thereof.

The operation of the linearity compensation circuit according to the present invention as constructed above will be explained with reference to FIGS. 6 to 9. In FIGS. 6 and 7, the circuit elements according to the present invention which are same as those of the conventional linearity compensation circuit are marked with the same numerals, respectively, and explanation of the same elements will be omitted.

As described above, since the horizontal deflection sawtooth current for horizontal deflection flows to the horizontal deflection coil Ldy, the inductance value of the variable inductance transformer 8a is varied in response to the change of the display mode and in the first half and the latter half of the horizontal scanning interval to compensate for the picture linearity.

Specifically, the microcomputer 15 outputs a low-level control signal in the 4×3 standard mode. The transistor Q3 in the amplifying section 14 is turned off by the low-level control signal, and this causes the resistor R5 to be excluded from the parameters which determine the amplification factor of the amplifying section 14.

At this state, the transistor Q2 is base-biased by the resistors R1 and R2, and thus turned on. Accordingly, the power supply Vcc flows to ground through the primary winding Ti of the variable inductance transformer 8a, resistor R3, transistor Q2, and resistor R4, so that the inductance of the secondary winding To of the variable inductance transformer 8a is controlled.

The inductance control current as described above is varied depending on the horizontal deflection current value flowing from the horizontal output section 2 in the first half and the latter half of the horizontal scanning interval. Specifically, the horizontal deflection sawtooth current detected by the resistor Ra in the horizontal deflection current detecting section 12 is inverted by the transistor Q4 in the buffer 13, coupled through the capacitor C1, and then supplied to the base of the transistor Q2 in the amplifying section 14. This supplied voltage is superimposed on the DC base-biased voltage provided through the resistors R1 and R2, and this affects variation of the current flowing in the primary winding Ti of the variable inductance transformer 8a.

Accordingly, in the 4×3 standard mode, the current of I2 as shown in FIG. 9 flows to the primary winding Ti of the variable inductance transformer 8a in the first half of the horizontal scanning interval, and the inductance value of the secondary winding To of the variable inductance transformer 8a caused by this current is determined as of L2. In the latter half of the horizontal scanning interval, the current of I1 flows, and the inductance value is determined as of L1. Consequently, the condition where '$L_a=L_b$' as shown in FIG. 3A is satisfied, and thus the linearity of the displayed picture is uniformly maintained.

Meanwhile, the microcomputer 15 outputs a high-level control signal in the 16×9 wide mode. The transistor Q3 in the amplifying section 14 is turned on by the high-level control signal, and this causes the resistor R5 to take part in the amplification factor of the amplifying section 14.

At this state, the transistor Q2 is base-biased by the resistors R1 and R2, and thus turned on. Accordingly, the power supply $V_{cc}$ flows to ground through the primary winding Ti of the variable inductance transformer 8a, resistor R3, transistor Q2, and resistors R4 and R5, so that the inductance of the secondary winding To of the variable inductance transformer 8a is controlled.

The inductance control current as described above is varied depending on the horizontal deflection current flowing from the horizontal output section 2 in the first half and the latter half of the horizontal scanning interval, respectively. Specifically, the horizontal deflection sawtooth current detected by the resistor Ra in the horizontal deflection current detecting section 12 is inverted by the transistor Q4 in the buffer 13, coupled by the capacitor C1, and then supplied to the base of the transistor Q2 in the amplifying section 14. This supplied voltage is superimposed in the DC base-biased voltage provided through the resistor R1 and R2, and this affects variation of the current flowing in the primary winding Ti of the variable inductance transformer 8a.

Accordingly, in the 16×9 wide mode, the current of I2' as shown in FIG. 9 flows to the primary winding Ti of the variable inductance transformer 8a in the first half of the horizontal scanning interval, and the inductance value of the secondary winding To of the variable inductance transformer 8a caused by this current is determined as of L2'. In the latter half of the horizontal scanning interval, the current of I1' flows, and the inductance value is determined as of L1. Consequently, the condition where 'La'=Lb'' as shown in FIG. 3A is satisfied, and thus the linearity of the displayed picture is uniformly maintained.

From the foregoing, it will be apparent that the linearity compensation circuit for a wide-screen television receiver according to the present invention provides the advantages that it can uniformly compensate for left and right linearity of the picture to be displayed on the display screen regardless of the display mode of the 4×3 AR or the 16×9 AR by controlling the inductance value of the variable linearity coil in accordance with the change of the display mode, and in the first half and the latter half of the horizontal scanning interval, thereby providing a high-quality picture having no distortion.

While the present invention has been described and illustrated herein with reference to the preferred embodiments thereof, it will be understood by those skilled in the art that various changes in form and details may be made therein without departing from the spirit and scope of the invention.

What is claimed is:

1. A linearity compensation circuit for a wide-screen television receiver which adjusts a horizontal deflection current supplied to a horizontal deflection coil in accordance with a display mode which is determined by an aspect ratio, the linearity compensation circuit comprising:

a variable linearity compensation coil coupled to said horizontal deflection coil, an inductance value of said variable linearity compensation coil being varied;

a microcomputer for providing a control signal in accordance with a determined display mode; and a control circuit for controlling variation of said inductance value in response to said control signal, said control circuit comprising a horizontal deflection current detector for detecting a level of said horizontal deflection current supplied to said horizontal deflection coil.

2. A linearity compensation circuit for a wide-screen television receiver which adjusts a horizontal deflection current supplied to a horizontal deflection coil in accordance with a display mode which is determined by an aspect ratio, the linearity compensation circuit comprising:

a variable linearity compensation coil coupled to said horizontal deflection coil, an inductance value of said variable linearity compensation coil being varied;

a microcomputer for providing a control signal in accordance with a determined display mode; and a control circuit for controlling variation of said inductance value in response to said control signal, said control circuit comprising a horizontal deflection current detector for detecting a level of said horizontal deflection current supplied to said horizontal deflection coil, a buffer for inverting said horizontal deflection current detected by said horizontal deflection current detector, and an amplifier for amplifying said inverted horizontal deflection current from said buffer in accordance with said control signal from said microcomputer and providing said amplified current to said variable linearity compensation coil as an inductance control current.

3. A linearity compensation circuit for a wide-screen television receiver which adjusts a horizontal deflection current supplied to a horizontal deflection coil in accordance with a display mode which is determined by an aspect ratio, the linearity compensation circuit comprising:

a variable linearity compensation coil coupled to said horizontal deflection coil, an inductance value of said variable linearity compensation coil being varied, wherein said variable linearity compensation coil comprises a variable inductance transformer in which an inductance value of its secondary winding is varied in accordance with an inductance control current flowing to its primary winding;

a microcomputer for providing a control signal in accordance with a determined display mode; and a control circuit for controlling variation of said inductance value in response to said control signal, said control circuit comprising a horizontal deflection current detector for detecting a level of said horizontal deflection current supplied to said horizontal deflection coil, a buffer for inverting said horizontal deflection current detected by said horizontal deflection current detector, and an amplifier for amplifying said inverted horizontal deflection current from said buffer in accordance with said control signal from said microcomputer and providing said amplified current to said variable linearity compensation coil as said inductance control current.

4. A linearity compensation circuit for a wide-screen television receiver which adjusts a horizontal deflection current supplied to a horizontal deflection coil in accordance with a display mode which is determined by an aspect ratio, the linearity compensation circuit comprising:

- a variable linearity compensation coil coupled to said horizontal deflection coil, an inductance value of said variable linearity compensation coil being varied;
- a microcomputer for providing a control signal in accordance with a determined display mode; and
- a control circuit for controlling variation of said inductance value in response to said control signal, said control circuit comprising a horizontal deflection current detector for detecting a level of said horizontal deflection current supplied to said horizontal deflection coil and an amplifier, wherein said amplifier comprises a first transistor which is turned on/off in accordance with said logic control signal from said microcomputer, and a second transistor for amplifying said inductance control current with an amplification factor which is varied depending on an output level of a buffer and an on/off state of said first transistor, and providing an amplified inductance control current to said variable linearity compensation coil so as to vary said inductance value of said variable linearity compensation coil.

* * * * *